March 19, 1940.  H. S. BEGG  2,194,001
SHOCK ABSORBER
Filed May 16, 1938
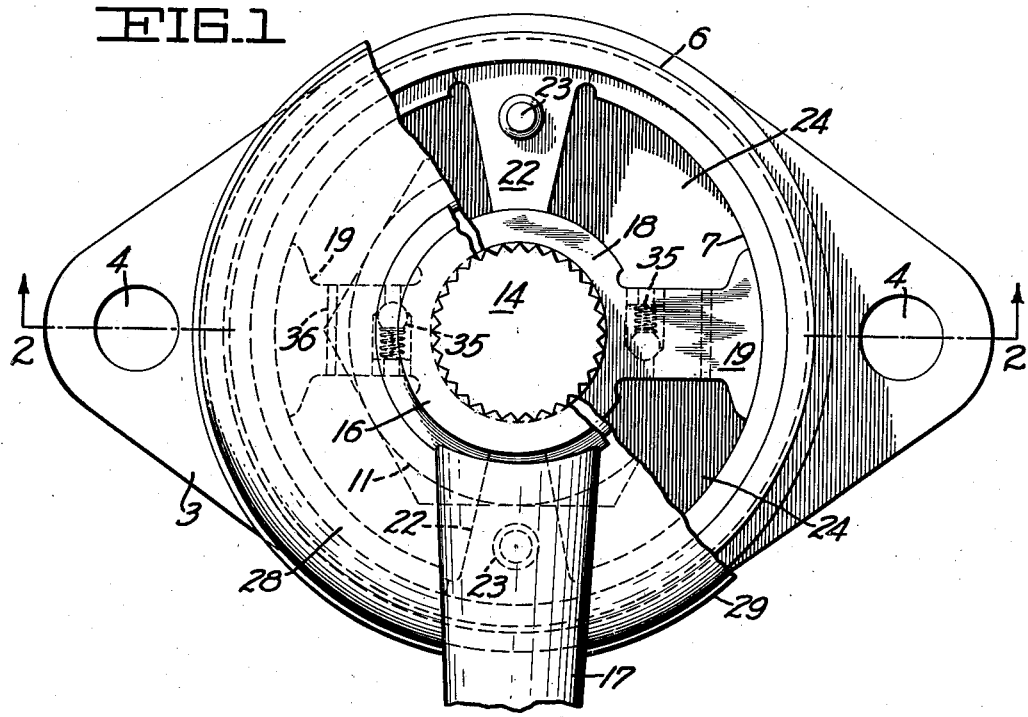
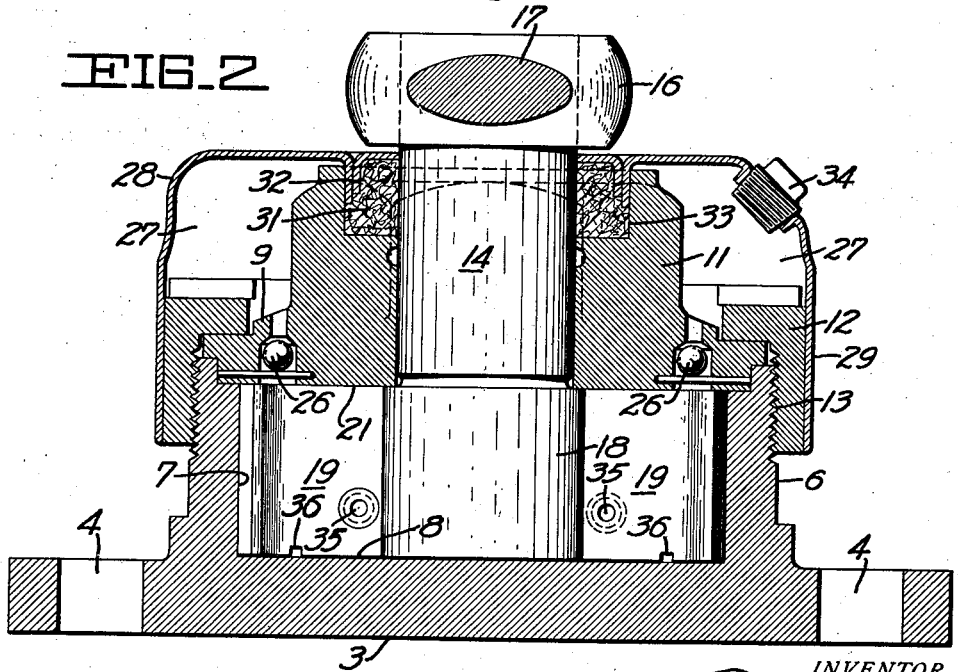
INVENTOR
BY Hugh S. Begg
Harry L. Schroeder
ATTORNEY Patented Mar. 19, 1940

2,194,001

UNITED STATES PATENT OFFICE 2,194,001

SHOCK ABSORBER

Hugh S. Begg, Oakland, Calif.

Application May 16, 1938, Serial No. 208,175

1 Claim. (Cl. 188—89)

This invention relates to shock absorbers particularly those of the hydraulic type.

It is an object of the invention to materially simplify the construction of shock absorbers.

Another object of the invention is to provide an improved shock absorber in which the small passages through which the fluid flows are not likely to become clogged with foreign matter.

The invention possesses other objects and features of advantage some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claim.

Referring to the drawing:

Figure 1 is a top plan view of a shock absorber incorporating the improvements of my invention. Portions of the view are broken away so as to more clearly disclose the interior construction.

Figure 2 is a vertical sectional view of the structure shown in Figure 1. The view is taken in the plane indicated by the line 2—2 of the latter figure, and the rotor is shown in side elevation for purposes of clarity in the drawing.

The structure shown in the drawing illustrates, for the most part, a conventional hydraulic shock absorber comprising a cylinder housing having a base plate 3 provided with apertures 4 through which suitable bolts may pass to fixedly secure the base plate to a rigid support which may be, for example, the frame of an automobile. Formed integrally with and rising from the base plate is a cylindrical boss 6 provided with a cylindrical chamber 7 having a closed bottom 8 formed by a portion of said plate, the surface thereof being smooth and unbroken. A cap 9 closes the upper end of the bore 7 and is provided with a centrally bored hub 11. A locking ring 12, which is attached to the hub 6 by screw threads 13, overlies the cap 9 and secures the latter to the hub. Journaled for rotation in the bore of the cap hub 11 is a shaft 14 whose outer end is fixed in the hub 16 of a lever 17 which is connected for movement by either of the spring-supported axles of the vehicle. The opposite end of the shaft 14 is provided with an integral cylindrical head 18 from which extends, in diametrically opposite directions, a pair of wings or pistons 19 whose distal ends are curved complemental to and terminate in sliding contact with the periphery of the bore 7 and whose width is such that the opposite sides of the wings slidably contact, respectively, the bottom surface 8 of the bore 7 and the bottom surface 21 of the cap 9. Extending inwardly from the wall of the chamber 7 and radially toward the axis thereof is a pair of diametrically opposed abutments 22, secured to the base 3 by suitable screws or pins 23, whose inner ends terminate at the periphery of the circular head 18 of the shaft 14. There is thus formed within the chamber 7 a pair of separate arcuate compartments each divided by a piston 19 into a pair of sections 24. Each of these compartments is adapted to be maintained filled with fluid, preferably light oil, which passes into the sections, when pressure no greater than atmospheric exists therein, through check valves 26 from a fluid reservoir 27 provided by a sheet metal hood 28 which overlies the cap 9. The skirt 29 of the hood 28 is pressed over the periphery of the locking ring 12 so as to provide a fluid-tight joint between the parts and hood, and at the center of its top is provided with an aperture through which the shaft 14 passes. A suitable packing gland 31, held by flanges 32 depending from the hood in a recess 33 formed in the cap hub 11, prevents leakage of fluid from the sections 24 outwardly past the shaft 14. A suitable filling plug 34 provides means for introducing fluid into the reservoir 27.

A shock absorber of this type functions by permitting flow of the fluid contained in one of the sections 24 into the other section through one or more check valves 35 provided in each piston 19. This flow is designed to proceed as rapidly as possible so that little resistance to rotation of the shaft will be effected. However, upon reversal of rotation of the shaft, the check valves 35 will close and the fluid passing from one section to the other will be forced to flow through other restricted passages. This will offer considerable resistance to rotation of the shaft. Heretofore it has been the practice to provide these passages through the hub 18 either by drilling straight holes therethrough or by providing several angularly intersecting holes. In the haste of production, these holes were not always cleaned of drill chips with the result that when the shock absorber is assembled and tested, it is frequently found to be inefficient in operation due to the clogged bleeder passages. To remedy the defect, the device had to be dismantled, cleaned out, and again assembled, thereby wasting valuable time. In many instances, clogging of an originally properly operating shock absorber would occur after the device had been in use for a considerable time. In practically all instances of this type of failure, the foreign matter that gets into and clogs the passages is introduced with refills of fluid placed in the reservoir.

To avoid the shortcomings which are caused by drilled passages, I provide for conduction of the fluid between pairs of compartments by cutting a bleeder groove 36 in the lower edge of each of the pistons 19. This provides passages having three sides formed in the movable pistons and one open side which is closed by the surface 8 of the stationary body 3. Thus, if any particle of solid matter, large enough to obstruct a passage, lodges in the latter, it will be rapidly ejected therefrom upon movement of the pistons since the relatively movable surfaces of the passage tend to roll the particle out of the passage from either end thereof. Other advantages accruing from this construction are ease of manufacture since cutting of the grooves may be accomplished in the lathe when the cylindrical surfaces of the rotor are turned thereby eliminating the necessity of transferring the piece to the drill press, practical elimination of the danger of undetected chips lodging in the grooves which might later cause defective operation of the shock absorber, total elimination of shutdown delay caused by drill breakage, and elimination of the need for costly manufacturing jigs.

Another important and desirable advantage presents itself by the provision of the passages 36. In certain types of shock absorbers, the check valve 35 and the bleeder passage 36 are combined in one element which is in the form of a thin sheet metal flap valve, performing the function of the valve 35, which is provided with a small central aperture equivalent to and performing the function of the passage 36. Due to the small amount of metal surrounding such an aperture, the latter has been known to rapidly enlarge due to abrasive action of small grits or metallic particles carried through the aperture by the flowing fluid. This enlargement of the bleeder opening seriously disturbs the adjustment of the shock absorber. In my improved construction, there is so much metal present about the bleeder opening that such abrasion will not noticeably affect the adjustment of the device and therefore the latter is capable of rendering longer trouble-free service than the aforementioned types of shock absorbers.

I claim:

A shock absorber comprising a base provided with a cylindrical boss extending from one face thereof in such manner as to provide a cylindrical chamber, a portion of said base constituting the bottom of said chamber, said bottom having a smooth unbroken surface, means for dividing said chamber into two compartments, a piston shaft, means for rotatively supporting said shaft, the latter having piston wings extending therefrom in diametrically opposite directions, the ends of said wings having sliding engagement with the inner side surface of said chamber, the lower edges of said wings having sliding engagement with said bottom surface, said wings being so positioned as to divide each compartment into two sections, and a check valve in each wing so positioned as to retard flow of liquid from one section of each compartment to the other section of the latter during rotation of the shaft in one direction, and to permit free flow of said liquid between said sections during movement of the shaft in the opposite direction, each wing having a small bleeder groove therein extended entirely across the bottom thereof, and so positioned that its open side is closed at all times by the smooth unbroken bottom surface of the chamber, said groove being so arranged that any foreign matter which may tend to collect therein will be automatically removed therefrom during travel of the pistons within the chamber.

HUGH S. BEGG.